United States Patent [19]
Domicone et al.

[11] 3,781,184
[45] Dec. 25, 1973

[54] SAFE BI-MODAL WINDSHIELDS
[75] Inventors: Joseph J. Domicone; Theodore R. Kozlowski, both of Horseheads, N.Y.
[73] Assignee: Corning Glass Works, Corning, N.Y.
[22] Filed: May 24, 1971
[21] Appl. No.: 146,176

[52] U.S. Cl............... 161/165, 161/189, 161/199, 161/231, 161/248, 161/259, 156/303.1, 156/306
[51] Int. Cl...................... B32b 17/10, B32b 27/08
[58] Field of Search................... 161/165, 189, 199

[56] References Cited
UNITED STATES PATENTS
| | | | |
|---|---|---|---|
| 3,282,722 | 11/1966 | Hailstone | 161/199 |
| 3,657,057 | 4/1972 | Shorr et al. | 161/199 |
| 3,658,636 | 4/1972 | Beckmann et al. | 161/199 |
| 3,539,412 | 11/1970 | Miller | 161/199 |
| 3,379,606 | 4/1968 | Bratton et al. | 161/189 |
| 3,556,923 | 1/1971 | Polejes | 161/189 |

FOREIGN PATENTS OR APPLICATIONS
| | | | |
|---|---|---|---|
| 828,381 | 2/1960 | Great Britain | 161/199 |

*Primary Examiner*—George F. Lesmes
*Assistant Examiner*—Charles E. Lipsey
*Attorney*—Clarence R. Patty, Jr. and Clinton S. Janes, Jr.

[57] ABSTRACT

This invention relates to motor vehicle windshields having a glass outer layer and a soft plastic inner layer which is protected from abrasion by a thin film of a low-permeability polymer such as polyvinyl fluoride. Such windshields provide nearly ideal protection from head and face lacerations in collisions at speeds up to about 36 m.p.h., and additionally provide excellent concussion protection.

1 Claim, 1 Drawing Figure

PATENTED DEC 25 1973 3,781,184
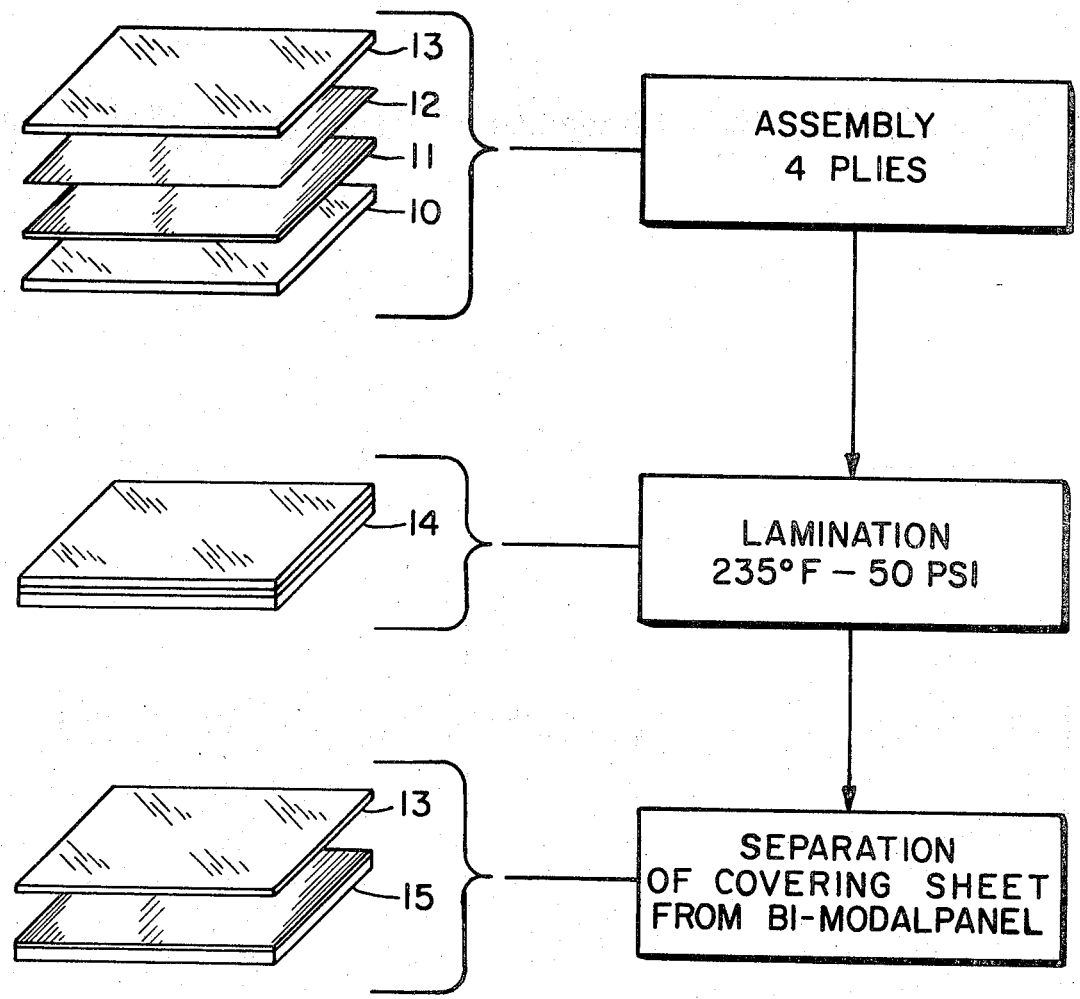
INVENTORS.
Joseph J. Domicone
Theodore R. Kozlowski
BY
Kees van der Sterre
ATTORNEY

SAFE BI-MODAL WINDSHIELDS

BACKGROUND OF THE INVENTION

Current North American practice is to provide motor vehicle windshields consisting of inner and outer glass sheets between which is contained a thin plastic interlayer. Glass is almost universally employed for both the inner and outer sheets because of its transparency and resistance to weathering and abrasion. Because glass is a brittle material, tending to shatter on impact into sharp, jagged pieces, the plastic interlayer is provided to hold the broken pieces in place and thus to protect vehicle occupants from jagged edges and flying pieces of glass. Nevertheless, the windshield is still one of the principal sources of personal injury in motor vehicle accidents, and research has been continuous to develop better and safer windshield materials and configurations.

These are two distinct types of injuries which occur when occupants are thrown against the windshield in a collision: lacerations and blunt trauma. Lacerations occur when an occupant's face and scalp are exposed to the sharp, stiff glass edges of a broken windshield, whether or not the head actually penetrates the windshield. A blunt trauma occurs as the result of the impact of the occupant with the windshield during the collision, and may involve concussion or skull fracture depending upon the violence of the collision and the impact strength of the windshield. Compiled data on persons involved in automobile accidents who have suffered windshield-related injuries indicates that lacerations from broken glass are more prevalent than blunt trauma. Nevertheless, there is a practical upper limit on the strength which should be provided in windshields, since an extremely strong windshield, while minimizing lacerations attributable to windshield breakage, would drastically increase the extent of impact-related injuries. It is already well within the skill of the art to provide thin glass of very high strength using either glass tempering or chemical glass strengthening techniques. However, a truly safe windshield which will neither lacerate nor cause blunt trauma has yet to be produced.

The problems relating to lacerations and impact injuries have long been recognized and numerous partial solutions to them have been proposed. C. G. Bragaw, Jr. et al. have disclosed in U.S. Pat. No. 2,946,711 new and thicker plastic interlayers designed to minimize blunt trauma. C. W. Davis has disclosed in U.S. Pat. No. 3,282,772 novel combinations of inner and outer glass plies and plastic interlayers of specific thickness which are effective in decreasing lacerations and impact-related injuries. J. R. Blizard, in a copending U.S. Pat. application, Ser. No. 879,317, now U.S. Pat. No. 3,592,726, filed Nov. 24, 1969 and commonly assigned herewith, describes a composite vehicle window wherein the inner ply is a thin and flexible strengthened glass sheet which will dice or break into many small blunt pieces on impact, rather than shatter into a few large pieces in the manner of tempered glass sheet. The ability of the thin inner ply to dice has substantially reduced injuries from laceration, and chemical strengthening of the sheet has imparted adequate impact strength and resistance to penetration to the windshield. For other discussions of these problems and proposed solutions see "Safety-Glass for Vehicle Windscreens" R. B. Lister, Glass Technology, Volume 2, No. 5, Oct. 1961, and "A Review of the Literature on Injury Potential of Automotive Safety Glass," Chester G. Bragaw, June 1, 1962, E. I. DuPont De Nemours and Company.

The concept of a bi-modal windshield wherein the inner layer is a plastic sheet directly bonded to a glass outer layer has recently been considered by automobile manufacturers. The main objective of such a configuration would be to eliminate the danger of laceration caused by head-to-glass contact subsequent to a collision. Such a design could also minimize head penetration caused by the tearing of the plastic sheet by an inner glass layer, and concussion would not be a problem since, unless the single glass outer pane were truly massive, its resistance to impact would be reduced by flaws caused by abrasion in normal use, or could be controlled by tempering or chemical strengthening techniques.

The main obstacle to the development of the bi-modal windshield has been the unavailability of plastics which are resistant to abrasion, chemically and physically durable, and resistant to discoloration upon exposure to ultraviolet radiation, and which are at the same time soft enough to flex or tear rather than fracture into pieces on impact.

It is accordingly the principal object of the present invention to provide a bi-modal windshield which is not only extremely effective in minimizing laceration and impact-related injuries in collisions, but also reasonably durable and resistant to discoloration and abrasion.

Other objects and advantages of the invention will become apparent from the following detailed description thereof, and from the appended drawing, which illustrates in diagrammatic form a method of making the windshield of the invention.

SUMMARY OF THE INVENTION

We have now discovered a configuration for a bi-modal windshield having a combination plastic inner layer and a glass outer layer which offers not only a reasonable degree of durability and abrasion resistance, but also an extraordinary amount of protection from lacerations in collisions at moderate speeds.

Briefly, the bi-modal windshield of the invention comprises a glass outer layer to which is bonded an inner layer of a relatively soft plastic such as polyvinyl butyral. This soft plastic inner layer is protected from abrasion and chemical attack by a very thin film of a low-permeability polymer such a polyvinyl fluoride, which is bonded thereto and which forms an integral and permanent part of the windshield. Such a configuration provides not only a windshield offering concussion protection as good as any conventional windshield produced to date, but also a windshield which is essentially laceration-free in collisions at speeds up to about 36 m.p.h.

The bi-modal windshields of the present invention may be produced by a procedure comprising the steps of preparing a laminate consisting of the glass outer sheet, the soft plastic inner sheet, the thin film of low-permeability polymer and a smooth rigid covering sheet, preferably of glass; subjecting the laminate to pressure at elevated temperatures to bond the soft plastic inner layer to the glass and the low-permeability polymer to the plastic; and, finally, removing the covering sheet. No adhesives or release agents are normally required.

The invention may be further understood by reference to the following detailed description thereof, and to the appended Drawing which illustrates in schematic form the steps of assembly, lamination and separation which comprise the method by which the windshields of the present invention may be made.

DESCRIPTION OF THE PREFERRED EMBODIMENTS

The outer glass sheet of the windshield of the present invention may be annealed, tempered, or strengthened glass. However, we prefer to employ annealed glass sheets rather than strengthened or tempered glass so that the severity index number, an indicator of the magnitude of the concussive forces to which a head would be subjected on impact with the windshield, will be kept low. The severity index number, which is based on a Human Tolerance Curve developed at Wayne State University to provide a quantitative guide for controlling the factors giving rise to blunt trauma, is calculated from the area under the curve resulting from a plot of the acceleration of a head-form impacting the windshield as a function of time. A severity index number of about 1,000 at 30 m.p.h. is the current, generally accepted maximum allowable value for automobile windshields. In developing safe components, it is desirable to keep the severity index as low as possible. For discussions related to the derivation and development of the severity index number as a windshield safety indicator, reference may be made to "Human Tolerance to Impact Conditions as Related to Motor Vehicle Design," S.A.E. Handbook Supplement J885, 1964, and "Use of a Weighted-Impulse Criterion for Estimating Injury Hazard" reprinted by S.A.E. Dec. 1966, from Conference Proceedings — 10th Stapp Car Crash Conference.

We have found that annealed glass sheets can provide adequate strength and resistance to stone damage so that the use of strengthened or tempered glass to provide higher impact strengths is not required. Furthermore, the use of tempered or strengthened glasses may actually be undesirable if the severity index number of the resultant windshield is increased thereby. Thus we have found that annealed glass panels having a thickness in the range from about 0.070 – 0.125 inches are suitable, and panels ranging up to a thickness of about 0.105 inches are particularly preferred, in producing bi-modal windshields according to the present invention. With such panels, severity index numbers not exceeding about half the maximum allowable value at 30 m.p.h. are obtainable, these values comparing favorably with the safest windshields produced to date insofar as protection from concussion is concerned.

The preferred plastic inner layer for the purposes of the present invention is polyvinyl butyral. This material is preferred because it readily adheres to glass upon subjection to heat and pressure, is not discolored by ultraviolet radiation, is readily commercially available in sheet form, and is both soft and tough so that it will absorb impacts without shattering or excessive tearing. Other soft plastics, such as polymerized ethylene dioxide, may be employed, but polyvinyl butyral provides the best combination of softness, toughness, resistance to discoloration by ultraviolet radiation and ease of bonding.

Harder plastics such as the polycarbonates and acrylics are not considered suitable for use in our bi-modal windshields for several reasons. First, the extraordinary hardness of certain of these plastics, such as Plexiglas, causes them to shatter rather than flex and tear on impact. They thus present a laceration hazard similar to that of glass, especially at speeds approaching 30 m.p.h. Secondly, the qualities of hardness and inflexibility impart excessively high impact strengths to these materials, so that the severity index number and risk of blunt trauma are increased therewith. Finally, the thermal expansion mismatch between glass and most plastics gives rise to stresses which are minimized by soft plastics such as polyvinyl butyral, but which present formidable bonding problems with the harder plastics. Adhesive systems can be formulated to alleviate these bonding problems, but transparency and service life are usually adversely affected thereby. Also, adhesive systems have a strong tendency to permit delamination on impact, causing large pieces of glass to fly from impacted panels.

More specifically, we prefer to employ high-impact polyvinyl butyral inner layers containing less than about 0.08 percent and preferably between about 0.03 – 0.06 percent of moisture by weight and having a thickness in the range from about 0.030 – 0.045 inches. The correct moisture level helps to promote good bonding, while imparting excellent penetration resistant qualities to the plastic. The preferred thicknesses are sufficient to provide excellent laceration protection without adversely affecting the severity index number of the windshield. Sheets thinner than about 0.015 inches should not be employed, since they result in increased laceration by penetration, while the use of sheets thicker than about 0.060 inches may result in undesirable increases in the severity index of the window, especially at lower velocities.

The effect of glass and plastic inner layer thickness on both lacerations and severity index was tested by preparing 2' × 3' test panels having plastic inner layers of different thicknesses and subjecting these panels to the impact of a head-form in simulated collisions ranging up to about 36 m.p.h. The head-form contained accelerometers to measure the severity index number and was covered with one-half inch of vinyl rubber, one-fourth inch of natural rubber and two layers of chamois so that the lacerative potential of each configuration could be evaluated. Outer glass sheet thicknesses of 0.105 and 0.070 inches were employed.

Representative results of such tests are set forth in Table I below, which lists laceration values, severity index numbers and plastic inner layer damage, if any, resulting from collisions at various speeds for panels of several different configurations. Also included in Table I are corresponding values obtained under the same testing conditions for conventional safety windows of the type currently in use on American automobiles.

The laceration values shown in Table I were derived by evaluating the extent of cutting and tearing damage sustained by the chamois- and rubber-covered headform. Laceration values range from 0 to 10 depending upon the extent of the damage sustained, with a value of 0 being given when the outer layer of chamois sustains no scuffing, cutting, tearing or like damage during the test, and a value of 9 or 10 being assigned in the case of massive cutting and tearing of both layers of the chamois and penetration into the rubber layers of the head-form.

As previously suggested, the plastic inner layer serves the dual function of retaining broken glass in the windshield to minimize the possibility of injury from flying glass and preventing penetration of the broken windshield by vehicle occupants to minimize the laceration hazard. Tearing of the inner layer or penetration thereof by the head-form is considered undesirable for the above reasons, although laceration as the result of tearing or penetration does not result in every case. Table I also shows the extent of plastic inner layer damage, if any, occurring in each collision. All panel configuration values are given in mils of sheet thickness, and all of the windshields made according to the invention had a thin (1.5 mils) inner film of polyvinyl fluoride not shown in the Table configurations, to protect the polyvinyl butyral (PVB) plastic layer from abrasion damage. All severity index values have an uncertainty of 30–50 units due to the exponential effect of speed error on the index calculations.

TABLE I

| Configuration (mils thickness) | Speed (m.p.h.) | Severity index | Laceration | Inner layer damage |
|---|---|---|---|---|
| 15 PVB, 70 glass (annealed). | 20.9 | 111 | 0 | Total penetration. |
| 15 PVB 105 glass | 21.3 | 139 | 9 | Do. |
| Do | 29.7 | 308 | 0 | Do. |
| 30 PVB, 70 glass | 21.2 | 146 | 0 | None. |
| Do | 27.1 | 327 | 0 | Do. |
| Do | 30.1 | 463 | 0 | 2.5 inch tear. |
| 30 PVB, 105 glass | 21.6 | 176 | 0 | None. |
| Do | 26.9 | 292 | 0 | Do. |
| Do | 28.9 | 450 | 0 | 0.5 inch tear. |
| Do | 36.5 | 1,533 | 0 | None. |
| 45 PVB, 70 glass | 21.6 | 138 | 0 | Do. |
| Do | 29.9 | 436 | 0 | Do. |
| 45 PVB, 105 glass | 21.8 | 154 | 0 | Do. |
| Do | 29.9 | 386 | 0 | Do. |
| 60 PVB, 70 glass | 21.9 | 270 | 0 | Do. |
| Do | 29.2 | 456 | 0 | Do. |
| 60 PVB, 105 glass | 21.8 | 181 | 0 | Do. |
| Do | 29.9 | 495 | 0 | Do. |
| 90 glass, 30 PVB, 90 glass (float). | 21.8 | 232 | 7.0 | Do. |
| Do | 25.8 | 346 | 5.5 | Do. |
| 90 glass, 30 PVB, 90 glass (annealed). | 21.3 | 156 | 5.5 | 1 inch tear. |
| Do | 24.8 | 279 | 8.0 | 2 inch tear. |
| Do | 30.3 | 432 | 9.0 | 5 inch tear. |
| 125 glass, 30 PVB, 125 glass (plate). | 23.3 | 269 | 7.0 | None. |
| Do | 23.1 | 210 | 9.0 | 1 inch tear. |
| Do | 29.3 | 322 | 10.0 | 2 inch tear. |
| Do | 30.3 | 426 | 9.0 | 6 inch tear. |

From a review of the data contained in Table I it is readily apparent that the bi-modal windshields of the present invention provide essentially complete protection from laceration at speeds at least up to about 36 m.p.h., while at the same time providing concussion protection equivalent to that provided by any of the safety configurations presently in use. Polyvinyl butyral inner layers ranging in thickness from about 0.030 – 0.045 inches provide the best combination of laceration and impact protection; and, accordingly, they are preferred.

Similar tests were carried out with bi-modal panels employing harder plastics such as acrylics and polycarbonates as the inner layer. The polycarbonates were found to be too stiff, giving unacceptably high severity index values even in 30 mil sheets to be suitable for use in the configurations of the invention and posing severe bonding problems. In several instances, delamination of the plastic from the glass occurred on impact and the glass pieces became very effective and dangerous missiles. In the case of the acrylics, delamination was also a problem, and in addition, these plastics tended to demonstrate brittle fracture on impact. In one panel employing a 30 mil polymethylmethacrylate (Plexiglas) inner sheet, impact resulted in the penetration of both chamois and rubber layers of the head-form by a large plastic shard. Accordingly, it was concluded that acrylic and polycarbonate plastics are poor choices for windshield inners.

The practical utility of the windshields of the present invention is largely attributable to the use of a low-permeability polymer film to protect the soft plastic inner layer from casual damage. Although the inner side of an automotive windshield is not subject to the same degree of abrasion and physical punishment as is the outer layer, it still must be sufficiently chemically and physically durable to withstand moisture and moderate abrasion such as would be encountered upon washing. None of the available plastics have heretofore been considered for use as unprotected automotive windshield inners because of the problems of physical and chemical durability. In some cases, a good degree of surface hardness can be achieved with certain of these plastics using appropriate chemical treatments, but the scratch resistance of such hardened plastics is still inadequate for automotive applications and the hardness is expected to adversely affect the severity index number of the plastic.

We have now discovered that certain low-permeability polymer films can impart both good scratch resistance and adequate chemical durability to a glass-plastic laminate, provided a soft rather than a hard plastic is used as the inner layer. Thus the resilience of the inner layer is necessary to permit the protective polymer film to remain flexible enough to resist damage by casual scratching and abrasion, while the low permeability of the polymer protects the composite from delamination under the influence of moisture. In addition, many of these films exhibit a surprising bonding compatibility with the preferred polyvinyl butyral inner layers, so that adhesive systems are not required in the manufacture of a durable windshield.

Suitable film polymers include polyvinyl fluorides such as TEDLAR PVF film, polyesters such as MYLAR polyester film, polyvinylidene chlorides, cellulose acetate, SURLYN A ionomer resin an ionized olefin copolymer, and phenoxy polymers. The primary requisites of such films are low-permeability to moisture and gases, chemical stability, good resistance to ultraviolet radiation and sufficient flexibility to provide the necessary scratch resistance. The best combination of properties for the purposes of the present invention is exhibited by the polyvinyl fluoride films such as TEDLAR. These materials have excellent resistance to darkening under ultraviolet radiation without the use of u. v. absorbing additives, good transparency, and low permeability to gases and moisture. Furthermore, their fluorocarbon structure imparts excellent chemical durability and good resistance to penetration by abrasive particles while, surprisingly, not adversely affecting the capability of the film to bond well to polyvinyl butyral without adhesives. Accordingly, polyvinyl fluoride films are preferred for use in the bi-modal windshields of the present invention.

Since the purpose of the polymer sheet is primarily to protect the soft plastic inner layer from damage, only a very thin film is required. We have found that films having a thickness in the range from about 1/2 – 5 mils (0.0005 – 0.005 inches) are suitable, with 1–2 mil thickness being preferred.

In manufacturing bi-modal windshields according to the present invention, we prefer to accomplish the bonding of the laminate through a combination of heat and pressure rather than through the use of an adhesive system. Adhesives may be used if desired, but are normally not required, and in addition cut down the light transmission of the windshield and add to the cost of manufacture. The manufacturing method generally comprises the steps of forming an assembly comprising a glass outer layer, a polyvinyl butyral inner layer, a protective low-permeability polymer film and a smooth rigid covering sheet, preferably of glass, and then laminating the assembly by subjecting it to elevated pressures at a temperature of at least about 200°F. for a time sufficient to bond the polyvinyl butyral inner layer to both the glass outer layer and the protective low-permeability polymer. We prefer to employ pressures ranging from about 50–300 p.s.i. and temperatures ranging between about 230–250°F., with these conditions being sufficient to accomplish adequate bonding in about 20–35 minutes. Insufficient temperatures and pressures can result in poor bonding, while excessive temperatures can result in the degradation of the polyvinyl butyral inner layer. Pressures above about 300 p.s.i. are not detrimental to the process but offer no particular advantage.

One particularly suitable method of manufacture includes a pre-lamination step wherein, prior to lamination, the assembly is placed in a rubber bag, the bag is evacuated, and the bag and assembly are then subjected to temperatures between about 230–250°F. for several minutes. This pre-lamination step permits the visual inspection of the laminate prior to the final lamination and makes the laminates easier to handle during the subsequent steps of the process. However, its use is optional, and the quality of the finished windshield will not be affected if the step is not employed.

The invention may be further understood by reference to the following detailed examples, and to the appended DRAWING illustrating a manufacturing method approximating that of Example I, which represents a specific preferred embodiment of the windshield and method of the invention.

EXAMPLE I

Referring now to the DRAWING, a sheet of annealed glass 10, 2 feet in width, 3 feet in length, and 0.070 inch in thickness was covered with a 0.030 inch thick sheet of polyvinyl butyral 11 of the same width and length. This assembly was then covered with a film of polyvinyl fluoride 12 having a thickness of 0.0015 inch. Finally, the polyvinyl fluoride film 12 was covered with a covering glass sheet 13 about 0.105 inch in thickness, to form a four-ply assembly 14 as shown in the DRAWING. The four-ply assembly was then placed in a rubber bag (not shown), the bag was evacuated, and the bag and assembly were placed in an oven (not shown) at a temperature of 235°F. for 25 minutes for pre-lamination. The assembly was then removed from the bag and inspected, and then placed in an air autoclave (not shown) at a pressure of 50 p.s.i. and a temperature of 235°F. for 25 minutes for lamination. Following heating the assembly was cooled under pressure to about room temperature and then removed from the autoclave. This lamination procedure is illustrated as the lamination step in the appended DRAWING, except that the pre-lamination step, which is optional, is not shown. Following lamination, the covering glass sheet 13 of about 0.105 inch thickness was readily separated from the bi-modal panel 15, as shown in the separation step of the DRAWING. It was found that the polyvinyl fluoride polymer film of the bi-modal panel demonstrated no tendency whatever to adhere to the covering glass sheet. On the other hand, it was tightly bonded to the polyvinyl butyral inner layer, resisting delamination even under severe impact testing as hereinbefore described.

EXAMPLE II

The plastic surface of the bi-modal panel as prepared in Example I was found to be quite resistant to casual scratching with sharp objects. Indentations left by attempts to scratch the plastic tended to "cure" themselves as the resilient polyvinyl butyral inner layer gradually returned to its unmarked smooth state. To further test the abrasion resistance of the panel, an abrasion test of the conventional type was performed wherein the transmission through the panel from a known light source was initially measured, the panel was then subjected to 100 cycles of abrasion by an abrasive stone under a 500 gram load, and the transmission of light from the known source through the panel again measured. Glass panels which had been similarly treated were also provided, so that a useful quantitative comparison of the effects of scratches on the panels of the invention and glass could be made. It was found that glass transmitted about 97 percent of the light initially transmitted after the treatment above described, while bi-modal test panels transmitted about 93 percent after abrasion. As expected then, glass is superior to polymer-protected soft plastic inner layers in terms of abrasion resistance. Nevertheless it appears that the scratch resistance of the polymer-protected soft plastic inner layer is surprisingly good, and that the bi-modal windshield therefor represents a useful solution to the problem of windshield safety.

We claim:

1. A bimodal automotive safety windshield consisting of an annealed glass outer layer having a thickness in the range of about 0.070–0.105 inches, a polyvinyl butyral inner layer bonded to said glass outer layer, having a thickness in the range of about 0.030–0.045 inches, and an inner film of polyvinyl fluoride bonded to said polyvinyl butyral inner layer, having a thickness in the range of about 0.001–0.002 inches, said bimodal safety windshield having a severity index number not exceeding about 500 at collision speeds up to about 30 mph and being essentially laceration-free at collision speeds up to about 36 mph.

* * * * *